(12) United States Patent
Kayacik et al.

(10) Patent No.: US 9,151,422 B2
(45) Date of Patent: Oct. 6, 2015

(54) PROFILE CLAMP

(71) Applicant: NORMA GERMANY GMBH, Maintal (DE)

(72) Inventors: Erkan Kayacik, Kadikoy/ Istanbul (TR); Manuel Baudoin, Newbury (GB); Jonathan Heywood, Hants (GB)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 13/917,255

(22) Filed: Jun. 13, 2013

(65) Prior Publication Data

US 2013/0334815 A1   Dec. 19, 2013

(30) Foreign Application Priority Data

Jun. 14, 2012   (EP) .................................... 12004486

(51) Int. Cl.
*F16L 25/00*   (2006.01)
*F16L 23/08*   (2006.01)

(52) U.S. Cl.
CPC .................................... *F16L 23/08* (2013.01)

(58) Field of Classification Search
USPC ......... 285/410, 420, 366, 367, 337, 419, 373; 24/279, 282, 285, 21, 20 S, 284
See application file for complete search history.

(56) References Cited

U.S. PATENT DOCUMENTS

| | | | | |
|---|---|---|---|---|
| 875,019 A | * | 12/1907 | Wahlert | ........................... 24/284 |
| 957,492 A | * | 5/1910 | Brown | ........................... 285/114 |
| 3,964,773 A | | 6/1976 | Stade et al. | |
| 6,030,006 A | * | 2/2000 | Lin | ............... 285/411 |
| 6,464,268 B1 | | 10/2002 | Hough et al. | |

FOREIGN PATENT DOCUMENTS

| | | |
|---|---|---|
| DE | 198 82 234 | 3/2000 |
| EP | 1 840 439 | 10/2007 |
| GB | 2 094 385 | 9/1982 |
| GB | 2 338 526 | 12/1999 |
| GB | 2 446 813 | 8/2008 |
| JP | 54-57409 | 5/1979 |
| JP | 1-255783 | 10/1989 |
| JP | 4-249692 | 9/1992 |
| JP | 10-176703 | 6/1998 |
| JP | 2006-83901 | 3/2006 |
| JP | 2011-117470 | 6/2011 |
| WO | 2010/126942 | 11/2010 |

OTHER PUBLICATIONS

Korean Office Action conducted in counterpart Korean Appln. No. 10-2013-0067337 (Jun. 3, 2014)(w/ English language translation).

(Continued)

*Primary Examiner* — Aaron Dunwoody
(74) *Attorney, Agent, or Firm* — Greenblum & Bernstein, P.L.C.

(57) ABSTRACT

Profile clamp and method of forming same. The profile clamp includes a first half-shell having a first tensioning head on a first circumferential end and a first connection geometry on a second circumferential end, a second half-shell having a second tensioning head on a first circumferential end and a second connection geometry on a second circumferential end, and, in an installation-ready state, a hinge connection, which is formed by an engagement between the first connection geometry and the second connection geometry, having a limited opening angle.

22 Claims, 2 Drawing Sheets

(56) References Cited

OTHER PUBLICATIONS

European Search Report conducted in counterpart European Appln. No. 12 004 486.2-1252 (Nov. 29, 2012) (w/ partial English language translation).

A China Office Action conducted in counterpart China Appln. No. 201310226329 (Jan. 21, 2015)(w/ English language translation).

Japanese Office action conducted in counterpart Japanese Appln. No. 2013-110980 (Mar. 4, 2014) )(w/ english translation).

* cited by examiner

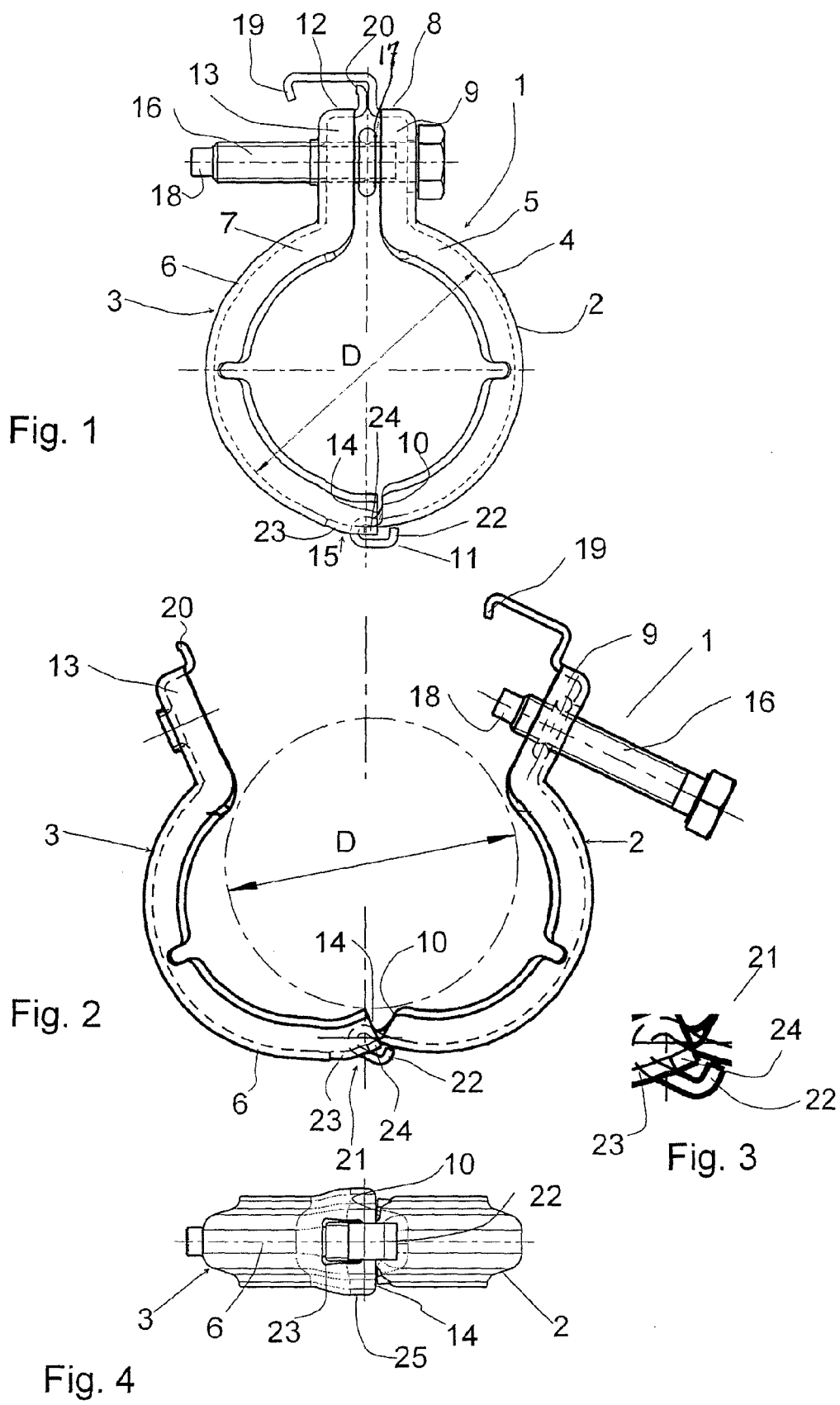

PROFILE CLAMP

CROSS-REFERENCE TO RELATED APPLICATIONS

The present application claims priority under 35 U.S.C. §119 of European Patent Application No. 12 004 486.2, filed Jun. 14, 2012, the disclosure of which is expressly incorporated by reference herein in its entirety.

BACKGROUND OF THE INVENTION

1. Field of the Invention

The invention relates to a profile clamp with a first half-shell having a first tensioning head on a first circumferential end and a first connection geometry on a second circumferential end, and with a second half-shell having a second tensioning head on a first circumferential end and a second connection geometry on a second circumferential end.

2. Discussion of Background Information

A profile clamp of the type generally described above serves to connect two pipes or pipe sections with one another. The pipes or pipe sections have radially outwardly extending flanges on their ends to be connected. These flanges may often have a conical cross-sectional shape and the profile clamp grips over the flanges of the pipe/pipe sections using legs that project radially inwards. During the tightening of the profile clamp, the flanges are then pulled towards one another.

A profile clamp of this type is known, e.g., from German Patent No. DE 198 82 234 B1 (and its counterpart UK Patent Application GB 2 338 526). The connection geometry on the first half-shell is formed by a type of hook, into which an end section of the second half-shell bent radially outwards can be inserted in order to connect the two half-shells to one another at their second circumferential ends. A tensioning screw, which is guided through the two tensioning heads, connects the two half-shells at the other end. This arrangement is intended to facilitate assembly. The two half-shells can be connected to one another by the tensioning screw namely before assembly, i.e., in the installation-ready state. In order to guide the profile clamp over the flanges of the pipe ends to be connected, the connection geometry is released and only restored when the profile clamp has reached its installation position.

SUMMARY OF THE EMBODIMENTS

Embodiments of the invention are directed to a simplified design and assembly of a profile clamp.

Accordingly, a profile clamp of the type generally discussed above includes, in an installation-ready state, a first connection geometry and a second connection geometry engaged with one another to form a hinge connection having a limited opening angle.

With a profile clamp of this type, a one-handed assembly is effectively possible. The two half-shells are opened away from one another at the hinge connection, and the hinge connection forms a type of hinge with a relatively clearly-defined pivot axis. This pivot axis runs parallel to the axial direction of the profile clamp, i.e., the two half-shells also remain aligned to one another. The technician can now guide the half-shells opened away from one another over the pipes and then close the half-shells together using one hand, so that a connection can be produced without difficulty in the region of the tensioning heads of the two half-shells. Following a successful positioning of the profile clamp, a second hand of the technician is possibly necessary in order to connect a tensioning screw to the two tensioning heads. The installation-ready state is the state in which the profile clamp is positioned in its place of use. This installation-ready state can coincide with a delivery state.

Preferably, the profile clamp has a nominal diameter and the opening angle allows an opening of the two half-shells away from one another far enough so that the half-shells are moveable through the nominal diameter past a flange in an axial direction. For the assembly of the profile clamp, two steps are then necessary. First, the profile clamp must be guided over a region outside of the flanges of one of the pipes that is to be connected. This is possible without difficulty because the pipe has a smaller diameter here than in the region of its flange. After this, the profile clamp is moved axially until it is positioned over the flanges of the pipes which are to be connected. It is then possible to close the two half-shells together. However, the advantage includes being able to keep the opening angle small, which facilitates handling.

Preferably, the first connection geometry has a ring-shaped loop, which is connected to the first half-shell, and the second connection geometry has a slot in the region of the circumferential end of the second half-shell. The loop is guided through the slot to connect the first and second connection geometries. An end region between the slot and the second circumferential end of the second half-shell is dimensioned so that it can only be pivoted in the loop up to a predefined limit angle position. Thus, the limiting of the opening angle is realized by the hinge connection itself. In the loop, the end section is only moveable within a limited angle range. In the limit angle position, the end section comes to lie on the inside of the loop, so that it cannot be further tilted or pivoted. A tilting or pivoting is, however, possible without difficulty in a direction away from the limit angle position, such that, when the profile clamp is positioned in situ, the two tensioning heads of the half-shells can be moved towards one another.

It is preferred that the loop is embodied or formed in the shape of a rectangle having a greater extension in a first direction than in a second direction perpendicular to the first direction. The end section is longer in a circumferential direction than the extension in the second direction. The term "in the shape of a rectangle" is not to be understood here in a mathematically narrow sense, but more generally. In this regard, the rectangle can indeed have rounded-off corners. It is also not necessary that two sides respectively run exactly parallel to one another. Rather, it is also possible that the sides of the loop are embodied or formed in a curved manner within certain limits. However, it is essential that, with a loop of this shape, the end section can assume a clearly defined limit angle position, past which it cannot be moved.

Further, it is preferred that the first direction extends in a circumferential direction. This simplifies assembly.

Preferably, the end section is smaller than a corner-to-corner diagonal of the loop. As a result, a sufficiently large area of movement is available for the end section inside the loop.

Preferably, the loop is embodied or formed in one piece with the first half-shell, which would simplify the production of the half-shell. The half-shell can, e.g., be formed from a metal, and the material for the loop can be left alone during the punching and bending. The connection between the loop and the half-shell thus receives a sufficient strength.

Preferably, the first half-shell has a base and two legs projecting radially inwards from the base, and the loop extends from the base. Because the material from which the loop is formed does not have legs, it is easily deformable such that the loop can be formed with little effort.

Preferably, the second half-shell has a base and two legs facing radially inwards from the base. Further, the loop, in an axial direction, has a smaller width than the base of the second half-shell. It is thus possible to embody the slot solely in the base of the second half-shell such that the second half-shell is not considerably weakened by the slot.

Preferably, the second circumferential end of the second half-shell has a widening. As a result, sufficient material can be provided such that the profile clamp can be tightened using a sufficient tension force without overstraining the material of the profile clamp.

Preferably, the legs of the second half-shell can be guided past the circumferential end of the first half-shell in the region of the widening. Thus, there results a sufficient movability of the two half-shells in the region of the hinge connection even when only a small space between the half-shells is provided in a circumferential direction. The opening angle is then limited solely by the embodiment of the hinge connection.

Preferably, one of the two tensioning heads has a locking device which is engagable on the other tensioning head. In this case, the assembly of the profile clamp can, up to a certain stage, be carried out completely using one hand. The technician first guides the two half-shells over the pipe, then over the flanges, and then closes them together so that the tensioning heads are locked to one another. Only then does the technician need to use the tensioning element, e.g., a screw. This can possibly also take place using one hand, such that the installation space necessary for assembly can be kept small.

In a preferred embodiment, an opening spring acts in an opening direction between the two half-shells. The opening spring causes the two half-shells with their tensioning heads to be pivoted away from one another until the maximum opening angle is reached. In this way, an additional simplification for the handling of the profile clamp is provided when the profile clamp is being mounted. When the technician takes hold of the profile clamp, it is already in the opened state and remains in this opened state until the technician allows a force to act on the half-shells which overcomes the force of the opening spring. The technician will exert this force only after the profile clamp has been positioned in the desired assembly position. The opening spring should thereby not be dimensioned excessively strongly so that the force which the technician must exert when pressing the two half-shells together is also limited.

Preferably, the opening spring has two arms which act on the half-shells and are prestressed in the opening direction. This is a relatively simple embodiment. The opening spring can, for example, be embodied as a wire spring or as a leaf spring. If it is embodied as a wire spring, then it can for example have between the two arms a coiled section which produces the desired prestress in the opening direction.

Embodiments of the instant invention are directed to a profile clamp. The profile clamp includes a first half-shell having a first tensioning head on a first circumferential end and a first connection geometry on a second circumferential end, and a second half-shell having a second tensioning head on a first circumferential end and a second connection geometry on a second circumferential end. In an installation-ready state, a hinge connection, which is formed by an engagement between the first connection geometry and the second connection geometry, has a limited opening angle.

According to embodiments of the invention, the limited opening angle can be structured to allow an opening of the two half-shells far enough away from each another to accommodate a nominal diameter. Further, when opened to the limited opening angle, the profile clamp may be movable in an axial direction past a flange having the nominal diameter.

In accordance with other embodiments, the first connection geometry can include an annularly formed loop connected to the first half-shell, and the second connection geometry can include a slot in a region of the second circumferential end of the second half-shell, through which slot the loop is insertable. An end region between the slot and the second circumferential end of the second half-shell may be pivotable in the loop up only to a predetermined limit angle position. Further, the loop can be structured with a rectangular shape having a larger extension in a first direction than in a second direction that is perpendicular to the first direction, and the end section can be longer in a circumferential direction than an extension in the second direction. In further embodiments, the first direction can extend in the circumferential direction. Moreover, the end section may be smaller than a diagonal of the loop. In other embodiments, the loop can be formed in one piece with the first half-shell. Still further, the first half-shell may include a base and two legs facing radially inwards from the base, and the loop can extend from the base. The second half-shell can include a base and two legs facing radially inwards from the base, and the loop, in an axial direction, can have width smaller than the base of the second half-shell. The second circumferential end of the second half-shell can have a widening, and the legs of the second half-shell may be movable past the second circumferential end of the first half-shell in a region of the widening.

According to still other embodiments, one of the two tensioning heads can include a locking device engagable on the other tensioning head.

In further embodiments, an opening spring can be structured and arranged to act on in an opening direction between the two half-shells. The opening spring may include two arms that are structured and arranged to act on the two half-shells and that are prestressed in the opening direction.

Embodiments of the invention are directed to a method of forming a profile clamp. The method includes forming a first half-shell having a first tensioning head on a first circumferential end and a first connection geometry on a second circumferential end, forming a second half-shell having a second tensioning head on a first circumferential end and a second connection geometry on a second circumferential end, and engaging the first connection geometry with the second connection geometry to form a hinge having a limited opening angle.

According to embodiments, each of the first and second half-shells may include a base having two radially inwardly directed legs and the method can further include forming an annular loop having a rectangular shape and being connected to the base first half-shell, and forming a slot in a region of the second circumferential end of the second half-shell, whereby an end region is formed between the slot and second circumferential end of the second half-shell. The hinge can be formed by inserting the annular loop through the slot.

In accordance with other embodiments, the annular loop can be formed in a plane parallel to a plane of the hinged first and second half-shells, and a circumferential length of the end region and an axial extent of the loop may define the limited opening angle.

In embodiments, the method can further include forming a locking hook on a first circumferential end of one of the first or second half-shells, and forming a locking projection on the first circumferential end of the other of the first or second half-shells.

In accordance with still yet other embodiments of the present invention, the method can further include connecting a spring to the engaged first and second half-shells to bias the engaged first and second half-shells in an opening direction.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a profile clamp in the assembled state;
FIG. 2 shows a profile clamp in an installation-ready state;
FIG. 3 shows an enlarged excerpt from FIG. 2;
FIG. 4 shows the profile clamp according to FIG. 1 with a top view of a connection geometry.

DETAILED DESCRIPTION OF THE EMBODIMENTS

Figure 5:
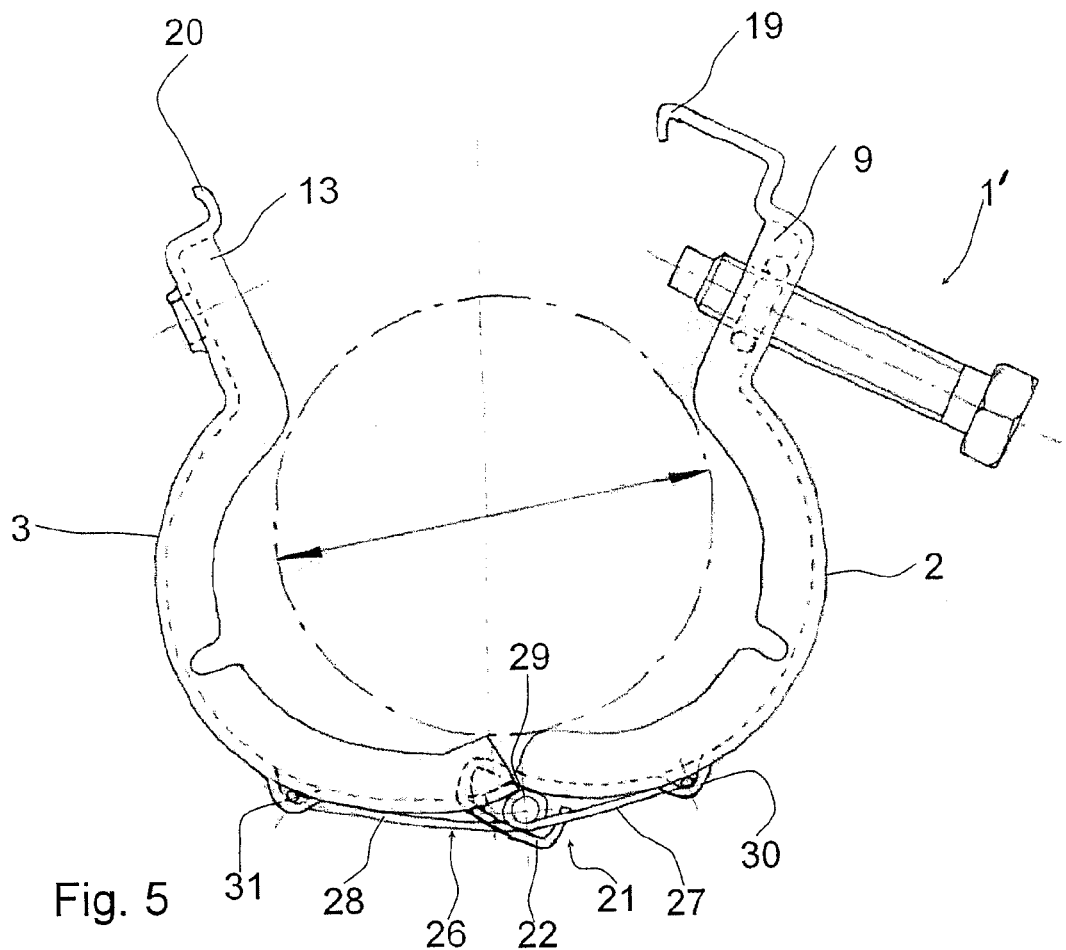
FIG. 5 shows a profile clamp with an opening spring.
Figure 6:
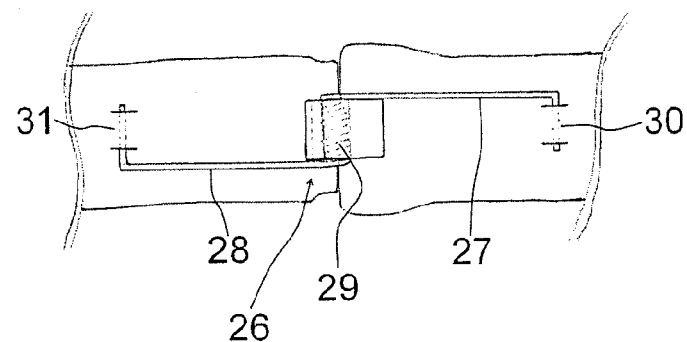
FIG. 6 shows the profile clamp from FIG. 5 with a view of the opening spring.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows a profile clamp 1 with a first half-shell 2 and a second half-shell 3. The first half-shell 2 has a base 4 and two legs 5 which project radially inwards from the base 4 and of which only one is visible. Base 4 and legs 5 together form in cross section a type of trapezoid. The second half-shell is similarly structured with a base 6 and two legs 7.

First half-shell 2 has a first tensioning head 9 on a first circumferential end 8 and has a first connection geometry 11 on a second circumferential end 10. Second half-shell 3 has a second tensioning head 13 on its first circumferential end 12 and has a second connection geometry 15 on its second circumferential end 14.

The two tensioning heads 9, 13 are connected to one another by a screw 16. Screw 16 is guided through first tensioning head 9 and screwed into a thread, which is not illustrated in greater detail, on second tensioning head 13. An O-ring 17 serves as loss prevention, such that screw 16, as can be recognized in FIG. 2, is unloseably retained in first tensioning head 9.

Screw 16 has an end 18 with a reduced diameter that facilitates the threading-in into second tensioning head 13. A locking hook 19 is attached on first tensioning head 9 to engage with a locking projection 20 connected to second tensioning head 13 when the two half-shells 2, 3 are moved towards one another from an installation-ready state, as illustrated in FIG. 2. In this installation-ready state, screw 16 does not yet need to engage with the second tensioning head 13.

Profile clamp 1 is provided for a nominal diameter D that corresponds to a maximum outside diameter of the flanges of the pipes. The two connection geometries 11, 15 together form a hinge connection, so that, as illustrated in FIG. 2, half-shells 2, 3 can be opened away from one another. Through connection geometries 11, 15, the hinge connection forms a type of hinge in which the two half-shells 2, 3 can only be pivoted in a common plane. A movement of the two half-shells 2, 3 relative to one another in a different direction, i.e., outside of the common plane, is effectively not possible or only possible to a negligible extent.

Hinge connection 21 formed by the two connection geometries 11, 15 has a limited opening angle. The opening angle is dimensioned in such a manner that the two half-shells 2, 3 can only be opened away from one another far enough so that they can be moved past nominal diameter D in an axial direction. In other words, the radial insides of legs 5, 7 can be moved past nominal diameter D in an axial direction, as is apparent from the dot-dash line drawn circle in FIG. 2. A further opening of the two half-shells 2, 3 is not necessary. For the assembly, the two half-shells 2, 3 are opened away from one another into the position illustrated in FIG. 2 and guided over a pipe section which has a smaller diameter than the flange of the pipe section. Accordingly, this pipe section can also be guided through the narrowest position that results on the radially inside end of the two tensioning heads 9, 13. After this, an axial movement of profile clamp 1 is necessary in order to move profile clamp 1 past the flanges. Once profile clamp 1 has reached its assembly position in an axial direction, i.e., to at least partially surround the flanges, the two half-shells 2, 3 can be closed together. This movement can take place using one hand. During the closing-together procedure, locking hook 19 can be hooked in behind locking projection 20 so that the technician has achieved a prepositioning of profile clamp 1 in which only the screwing-in of screw 16 into second tensioning head 13 is still necessary.

Hinge connection 21 is illustrated in an enlarged scale in FIG. 3. From FIG. 3, it can be recognized that first connection geometry 11 has a ring-shaped loop 22, which is essentially embodied or formed in the shape of a rectangle. Thus, loop 22 has a larger extension in a circumferential direction of profile clamp 1 than in a direction perpendicular thereto, i.e., in radial direction.

The second connection geometry 15 has a slot 23 in base 6 of second half-shell 3 arranged so that loop 22 is guided through slot 23. Between slot 23 and second circumferential end 14 of second half-shell 3, an end section 24 remains that can be pivoted within certain limits in loop 22. End section 24 can, as illustrated in FIG. 1, be pivoted roughly in a circumferential direction in the loop 22 and can, as illustrated in FIGS. 2 and 3, be pivoted in loop 22 up to a predetermined limit angle position. This limit angle position results from end section 24 being longer in a circumferential direction of profile clamp 1 than the extension of loop 22 in the direction perpendicular to the circumferential direction. However, end section 24 is in each case smaller than a diagonal of the 22.

Loop 22 is embodied or formed in one piece with first half-shell 2 to extend from base 4. Moreover, in an axial direction, loop 22 has, as illustrated in FIG. 4, a smaller width than base 6 of second half-shell 3.

In the region of second circumferential end 14, second half-shell 3 has a widening 25 so that enough material is available in second half-shell 3 to achieve a desired strength.

As shown in FIG. 4, the legs 7 in the region of widening 25 can be guided past circumferential end 10 of first half-shell 2.

FIG. 5 shows a profile clamp 1', which is a further embodiment of profile clamp 1 shown in FIGS. 1-4. In FIG. 5, identical elements are provided with the same reference numerals as in the FIGS. 1-4.

Profile clamp 1' according to FIG. 5 has an opening spring 26 which is arranged between two half-shells 2, 3. Opening spring 26 is embodied or formed, e.g., as a wire spring with two arms 27, 28. Between the two arms 27, 28, a coiled region 29 is arranged in loop 22. Coiled region 29 prestresses or biases arms 27, 28 in an opening direction, which is a direction in which tensioning heads 9, 13 move away from one another. In this way, the two half-shells 2, 3 assume their maximum opening angle and profile clamp 1' is quasi automatically brought into the installation-ready state.

Ends of arms 27, 28 are guided through brackets 30, 31 which are bent out from the half-shells 2, 3. Of course, other attachments are also possible.

Expediently, opening spring 26 is arranged externally on half-shells 2, 3.

In place of the illustrated wire spring, a different spring can of course also be used, e.g., a leaf spring. When using a leaf spring, one is not necessarily limited to an arrangement on the radial outside of half-shells 2, 3.

As explained above, opening spring 26 brings profile clamp 1' into the installation-ready state because it pushes half-shells 2, 3 apart from one another up to the largest possible opening angle. The opening angle is defined by hinge connection 21. In this way, the technician can take hold of profile clamp 1' and place it in the desired installation position in the opened state. After this, it is only necessary to stress the two half-shells 2, 3 using a force that opposes and overcomes the force of opening spring 26 in order to engage locking hook 19 with locking projection 20. This enables a very comfortable operation.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A profile clamp comprising:
   a first half-shell having a first tensioning head on a first circumferential end and a first connection geometry on a second circumferential end;
   a second half-shell having a second tensioning head on a first circumferential end and a second connection geometry on a second circumferential end;
   in an installation-ready state, a hinge connection, which is formed by an engagement between the first connection geometry and the second connection geometry, having a limited opening angle, wherein one of the first and second connection geometry comprises an elongated loop; and
   an opening spring structured and arranged to act on in an opening direction between the two half-shells.

2. The profile clamp according to claim 1, wherein the limited opening angle is structured to allow an opening of the two half-shells far enough away from each another to accommodate a nominal diameter.

3. The profile clamp according to claim 2, wherein, when opened to the limited opening angle, the profile clamp is movable in an axial direction past a flange having the nominal diameter.

4. The profile damp according to claim 1, wherein the first connection geometry comprises the elongated loop connected to the first half-shell, the second connection geometry comprises a slot in a region of the second circumferential end of the second half-shell, through which slot the loop is insertable, an end region between the slot and the second circumferential end of the second half-shell is pivotable in the loop up only to a predetermined limit angle position.

5. The profile clamp according to claim 4, wherein the loop is structured with a rectangular shape having a larger extension in a first direction than in a second direction that is perpendicular to the first direction, and
   wherein the end section is longer in a circumferential direction than an extension in the second direction.

6. The profile clamp according to claim 5, wherein the first direction extends in the circumferential direction.

7. The profile clamp according to claim 5, wherein the end section is smaller than a diagonal of the loop.

8. The profile damp according to claim 4, wherein the loop is formed in one piece with the first half-shell.

9. The profile damp according to claim 4, wherein the first half-shell comprises a base and two legs facing radially inwards from the base, and the loop extends from the base.

10. The profile clamp according to claim 9, wherein the second half shell comprises a base and two legs facing radially inwards from the base, and the loop, in an axial direction, has width smaller than the base of the second half-shell.

11. The profile clamp according to claim 10, wherein the second circumferential end of the second half-shell has a widening.

12. The profile clamp according to claim 11, wherein the legs of the second half-shell are movable past the second circumferential end of the first half-shell in a region of the widening.

13. The profile clamp according to claim 1, wherein one of the two tensioning heads comprises a locking device engagable on the other tensioning head.

14. The profile clamp according to claim 1, wherein the opening spring comprises two arms that are structured and arranged to act on the two half-shells and that are prestressed in the opening direction.

15. The profile clamp according to claim 1, wherein the other the first and second connection geometry comprises a slot through which the elongated loop is guidable.

16. A method of forming a profile clamp, comprising:
   forming a first half-shell having a first tensioning head on a first circumferential end and a first connection geometry on a second circumferential end;
   forming a second half-shell having a second tensioning head on a first circumferential end and a second connection geometry on a second circumferential end; and
   engaging the first connection geometry with the second connection geometry to form a hinge having a limited opening angle, wherein one of the first connection geometry and the second connection geometry comprises an elongated loop; and
   connecting a spring to the engaged first and second half-shells to bias the engaged first and second half-shells in an opening direction.

17. The method according to claim 16, wherein each of the first and second half-shells comprise a base having two radially inwardly directed legs and the method further comprises:

forming the elongated loop with a rectangular shape and being connected to the base first half-shell;

forming a slot in a region of the second circumferential end of the second half-shell, whereby an end region is formed between the slot and second circumferential end of the second half-shell, wherein the hinge is formed by inserting the elongated loop through the slot.

18. The method according to claim 17, wherein the elongated loop is formed in a plane parallel to a plane of the hinged first and second half-shells, and wherein a circumferential length of the end region and an axial extent of the loop define the limited opening angle.

19. The method according to claim 16, further comprising:

forming a locking hook on a first circumferential end of one of the first or second half-shells; and forming a locking projection on the first circumferential end of the other of the first or second half-shells.

20. The method according to claim 16, wherein the other of the first connection geometry and the second connection geometry comprises a slot, and the method further comprises guiding the elongated loop through the slot.

21. A profile clamp comprising:

a first half-shell having a first tensioning head on a first circumferential end and a first connection geometry comprising an elongated loop on a second circumferential end;

a second half-shell having a second tensioning head on a first circumferential end and a second connection geometry comprising a slot in a region of a second circumferential end;

in an installation-ready state, a hinge connection, formed by the elongated loop being guided through the slot, having a limited opening angle defined by an end region between the slot and the second circumferential end of the second half-shell being pivotable in a limited range within the loop; and an opening spring coupled to the first and second half-shells, the opening spring being structured and arranged to exert a force on the two half-shells in an opening direction.

22. The profile clamp according to claim 21, wherein the loop is structured with a rectangular shape having a first extension in a circumferential direction that is larger than a second extension in a second direction perpendicular to the circumferential direction, and wherein the end section in a circumferential direction is longer than the second extension.

* * * * *